3,734,722
PROCESS FOR THE QUANTITATIVE RECOVERY OF GOLD FROM AQUEOUS SOLUTIONS
Max Ziegler, Gottingen-Herberhausen, Germany, assignor to W. C. Heraeus GmbH, Hanau, Germany
No Drawing. Filed June 14, 1971, Ser. No. 153,114
Claims priority, application Germany, June 25, 1970, P 20 31 432.3
Int. Cl. C01g 7/00; C22b 11/00
U.S. Cl. 75—118                                3 Claims

ABSTRACT OF THE DISCLOSURE

Gold is recovered from mineral acid solution by forming a complex with tetrahydrofuran, dissolving the complex in an organic solvent and recovering the gold.

BACKGROUND

This invention relates to a process for the quantitative recovery of gold from aqueous solutions, especially in the case of very low gold concentrations.

It is known to separate gold from cyanide-containing solutions by reduction with bisulfite and/or hydrazine hydrate, but in the repeated performance of the process great and inexplicable variations in the gold yield have been encountered, and attempts have been made to diminish these variations by adding alkali metal salts of low alkane monocarboxylic or polycarboxylic acids and rapidly filtering out the gold precipitate before any of the precipitate redissolves.

Lastly, in the preparation of finely ground ores the mineral acid suspension is treated with an oxidizing agent that develops chlorine to increase the oxidation potential until gold and silver also dissolve. By changing the pH, iron and arsenic are precipitated as iron arsenate, and the gold is recovered from the solution which still contains especially cobalt and nickel, although no further teaching is given as to the technical procedure.

It is the object of the present invention to recover gold in a virtually quantitative manner from aqueous solutions by means of a simple procedure, thereby also making it possible to detect even traces of gold.

SUMMARY

This object is achieved by the invention by adding tetrahydrofuran (THF) to the mineral-acid solutions containing gold to form a gold complex, and transferring the gold-THF complex to an organic solvent which dissolves the complex.

DESCRIPTION

In a hydrochloric acid solution, for example, trivalent gold forms an oxonium compound with THF, which probably has the composition $[THF \cdot H]^+[AuCl_4]^-$. This is indicated by analyses, by nuclear resonance spectra and the integration thereof, and by the solubility characteristics. For example, the complex described dissolves very easily in methylene chloride or also in methylene bromide, and can therefore be extracted quantitatively from the aqueous phase. The high solubility of the complex in halogenated hydrocarbons is accounted for not only by the hydrophobizing action of THF on the complex transition metal ion that is in the aqueous phase, but probably also by an aggregation of the THF as well as an interaction between the THF and the halogenated hydrocarbon such as methylene chloride used as the extracting agent, which, as the examples will show, permits a quantitative extraction of the gold, even with a small amount of extracting agent. The nature of the interaction consists possibly in a building of hydrogen bridges, which in the non-aqueous phase starts the formation of oxonium and stabilizes the oxonium compound.

Since the process of the invention makes it possible to obtain a quantitative yield, examples hereinafter illustrate this using very low gold concentrations in some cases and gold quantities in the gamma range in other. The amount of THF that has to be used for the quantitative extraction of the gold-THF complex depends on the acid concentration, and this is indicated by the following series of experiments:

A specimen volume of 50 ml. of hydrochloric acid solution containing 240.5 $\mu$g. of $Au^{3+}$ is treated with THF, and is extracted twice with 3 ml. and a third time with 1 ml. of methylene chloride, and the extracts, after phase separation, are filtered into a 10 ml. measuring flask through a filter made of filter flasks. The test for complete extraction is performed by extinction measurement at the 325 nm. absorption maximum of the gold-THF complex. This test showed the following relationship: if the specimen solution has a 4% concentrated hydrochloric acid content, the given amount of gold is extracted through two additions of 2.5 ml. THF; at 8% acid, 2.0 ml. suffice, and at 80% concentrated hydrochloric acid, only 1 ml. of THF will suffice for the quantitative extraction of the gold. Acid concentrations of more than 80% concentrated hydrochloric acid also permit quantitative extraction, but in that case the phase separation always takes longer than 15 minutes, while at less than 80% acid it takes on the order of 5 to 10 minutes.

The extinction of the extraction solution at 325 nm. remains absolutely constant for 8 hours, and even after 100 hours it has diminished by no more than 2.7%. On account of its stability, therefore, the solution can be stored without impairment for as long as needed before it is processed. This shows the high stability of the $[AuCl_4]$ complex, from which the gold is easily recovered. After the evaporation of the non-aqueous solvents, the gold thus remains in the form of $H[AuCl_4]$ which can be transformed, as known, to $AuCl_3$, or else the metal is removed by cementation from the non-aqueous phases, which can be reused.

In the recovery figure determined by extinction measurement, errors on the plus side can occur if the THF and HCl concentration is too high, because the THF-ClH complex slightly increases the extinction of the methylene chloride solution, which of course has no effect on the gold recovery after the processing of the extraction solution.

The separation of the gold from iron, cobalt and nickel presents no special difficulty; when iron is present in the aqueous acid solution, however, it is recommendable not to exceed 20% free concentrated hydrochloric acid, because otherwise small amount of complex iron chlorides might also be extracted. If the foreign metal ion concentration is greater than 40,000:1, traces can be carried mechanically into the non-aqueous phase. This problem, however, can easily be remedied by shaking the non-aqueous phase once or twice through a filter-flake plug filter or to purify the non-aqueous phase by shaking it once with a "re-agitation solution," an aqueous solution containing 10% concentrated hydrochloric acid and 4% THF.

Table 1 contains a review of a series of probatory analyses relating to simple gold extraction and to the separation of gold from iron, cobalt and nickel.

TABLE 1.—THE EXTRACTION OF GOLD AND THE SEPARATION OF IRON, COBALT AND NICKEL

| Micrograms of gold | | Error (percent) | Accompanying ions | | Ratio of $Au^{3+}$ to accompanying ion, 1:X |
|---|---|---|---|---|---|
| Given | Found | | Ion | Mg. | |
| 48.09 | 48.3 | +0.4 | | | |
| 96.19 | 95.2 | −1.0 | | | |
| 120.24 | 121.0 | +0.6 | | | |
| 168.33 | 168.0 | −0.02 | | | |
| 240.50 | 240.0 | −0.02 | | | |
| 96.19 | 94.5 | −1.8 | $Fe^{3+}$ | 2,000 | 1:20,800 |
| 48.09 | 48.1 | +0.02 | | 2,000 | 1:41,600 |
| 72.14 | 71.7 | −0.6 | | 2,000 | 1:27,800 |
| 24.05 | 23.9 | −0.6 | | 2,000 | 1:83,200 |
| 96.19 | 95.9 | −0.3 | $Co^{2+}$ | 1,000 | 1:10,400 |
| 48.09 | 47.9 | −0.4 | | 800 | 1:16,600 |
| 24.05 | 24.8 | +3.1 | | 800 | 1:33,200 |
| 96.19 | 96.2 | +0.01 | $Ni^{2+}$ | 2,000 | 1:20,800 |
| 72.14 | 72.0 | −0.2 | | 3,000 | 1:41,600 |
| 24.05 | 25.1 | +4.4 | | 3,000 | 1:125,000 |

The separation of gold from copper, chromium and aluminum presents no greater difficulty. The re-agitation in this case is required beginning at Au:Cu ratios of 1:50,000, Au:Cr ratios of 1:30,000, Au:Al ratios of 1:9000. Table 2 reflects the outcome of these probatory analyses.

TABLE 2.—THE SEPARATION OF GOLD FROM COPPER, CHROMIUM AND ALUMINUM

| Micrograms of gold | | Error (percent) | Accompanying ions | | Ratio of $Au^{3+}$ to the accompanying ion, 1:X |
|---|---|---|---|---|---|
| Given | Found | | Ion | Mg. | |
| 72.14 | 72.1 | −0.05 | $Cu^{2+}$ | 1,370 | 1:19,000 |
| 48.09 | 48.9 | +1.7 | | 4,000 | 1:83,000 |
| 24.05 | 24.7 | +2.7 | | 4,000 | 1:166,000 |
| 96.19 | 95.9 | −0.3 | $Cr^{3+}$ | 900 | 1:9,360 |
| 96.19 | 97.0 | +0.8 | | 3,000 | 1:31,000 |
| 48.09 | 48.0 | −0.2 | | 3,000 | 1:62,500 |
| 24.05 | 24.4 | +1.5 | | 900 | 1:37,440 |
| 96.19 | 96.6 | +0.4 | $Al^{3+}$ | 300 | 1:3,120 |
| 48.09 | 48.1 | +0.02 | | 450 | 1:9,360 |
| 24.05 | 24.7 | +2.7 | | 300 | 1:12,480 |

The separation of gold from palladium, platinum, rhodium, iridium, ruthenium and osmium offers no difficulty, either. Re-agitation is recommended in this case at the following ratios: Au:Pt, Pd, Rh, beginning at 1:1,500; Au:Ir beginning at 1:1,000; Au:Ru, beginning at 1:200. The separation is successful also in mixtures of all 6 platinum metals, and this makes possible the precise analysis of the gold content in alloys of the platinum metals. The probatory analyses are found in Table 3.

TABLE 3.—THE SEPARATION OF GOLD FROM PALLADIUM, PLATINUM, RHODIUM, IRIDIUM, RUTHENIUM AND OSMIUM

| Micrograms of gold | | Error (percent) | Accompanying ions | | Ratio of $Au^{3+}$ to the accompanying ion, 1:X |
|---|---|---|---|---|---|
| Given | Found | | Ion | Mg. | |
| 96.19 | 96.4 | +0.2 | $Pd^{2+}$ | 120 | 1:1,250 |
| 24.05 | 24.5 | +1.9 | | 120 | 1:5,000 |
| 48.09 | 47.8 | −0.4 | | 8 | 1:166 |
| 72.14 | 72.0 | −0.2 | $Pt^{4+}$ | 6 | 1:82 |
| 48.09 | 48.4 | +0.6 | | 155 | 1:3,228 |
| 24.05 | 25.1 | +4.0 | | 155 | 1:6,456 |
| 96.19 | 96.9 | +0.7 | $Rh^{3+}$ | 10 | 1:104 |
| 72.14 | 72.5 | +0.5 | | 20 | 1:278 |
| 24.05 | 23.8 | −1.0 | | 40 | 1:1,660 |
| 96.19 | 95.2 | −1.0 | $Ir^{4+}$ | 7 | 1:73 |
| 24.05 | 24.3 | +0.6 | | 7 | 1:290 |
| 24.05 | 23.4 | −2.7 | | 30 | 1:1,248 |
| 96.19 | 97.1 | +0.9 | $Ru^{4+}$ | 5 | 1:52 |
| 72.14 | 73.8 | +2.3 | | 5 | 1:69 |
| 48.09 | 49.3 | +2.5 | | 5 | 1:104 |
| 96.19 | 96.1 | +0.7 | $Os^{4+}$ | 10 | 1:104 |
| 48.09 | 48.2 | +0.2 | | 75 | 1:1,564 |
| 24.05 | 23.9 | −0.6 | | 10 | 1:3,128 |
| 48.09 | 49.2 | +2.3 | $Pd^{2+}$ | 2 | 1:41 |
| | | | $Pt^{4+}$ | 16 | 1:332 |
| 96.19 | 97.5 | +1.4 | $Pd^{2+}$ | 11 | 1:114 |
| | | | $Pt^{4+}$ | 4 | 1:41 |
| | | | $Rh^{3+}$ | 8 | 1:82 |
| | | | $Ir^{4+}$ | 2 | 1:20 |
| | | | $Ru^{4+}$ | 5 | 1:52 |
| | | | $Os^{4+}$ | 4 | 1:40 |
| | | | Total 34 | | 1:349 |
| 72.14 | 72.2 | +0.1 | $Pd^{2+}$ | 0.1 | 1:1.4 |
| | | | $Pt^{4+}$ | 1 | 1:14 |
| | | | $Rh^{3+}$ | 16 | 1:210 |
| | | | $Ir^{4+}$ | 2 | 1:28 |
| | | | $Ru^{4+}$ | 2 | 1:28 |
| | | | $Os^{4+}$ | 3 | 1:42 |
| | | | Total 24.1 | | 1:323.4 |
| 72.14 | 74.1 | +2.7 | $Pd^{2+}$ | 8 | 1:111 |
| | | | $Pt^{4+}$ | 8 | 1:111 |
| | | | $Rh^{3+}$ | 2 | 1:28 |
| | | | $Ir^{4+}$ | 2 | 1:28 |
| | | | $Ru^{4+}$ | 2 | 1:28 |
| | | | $Os^{4+}$ | 3 | 1:42 |
| | | | Total 25 | | 1:348 |

Thus, the process of the invention is characterized, as the examples show, by the quantitative recovery of the gold content, high specificity of gold determination, simple process steps and freedom from trouble. Alkalies and alkaline earths do not affect the gold determination, and neither do nitrate ions up to 0.5 mg. per specimen. The high specificity makes the process especially suitable for the detection of gold in copper, nickel, chromium and platinum metals as well as platinum metal alloys. Table 4 presents a summary of the specificity achieved in the separation of gold from foreign metals.

TABLE 4

Specificity of the detection of gold among foreign metals

| Accompanying metal: | Ratio of gold to accompanying metal |
|---|---|
| Iron | 1:83,200 |
| Cobalt | 1:33,200 |
| Nickel | 1:125,000 |
| Copper | 1:166,000 |
| Chromium | 1:125,000 |
| Aluminum | 1:18,720 |
| Arsenic | 1:124 |
| Antimony | 1:15 |
| Bismuth | 1:20 |
| Palladium | 1:5,000 |
| Platinum | 1:6,456 |
| Rhodium | 1:1,660 |
| Iridium | 1:1,248 |
| Ruthenium | 1:208 |
| Osmium | 1:3,128 |

What is claimed is:

1. Process for the selective and quantitative recovery of gold from aqueous hydrochloric acid gold containing solutions which comprises (a) adding tetrahydrofuran to said gold containing solution thereby forming a tetrahydrofuran-gold complex;

(b) extracting said complex by dissolving same in a halogenated hydrocarbon thereby forming a hydrocarbon phase and an aqueous phase; and (c) recovering said gold from the hydrocarbon phase by evaporating said halogenated hydrocarbon or by cementation from said halogenated hydrocarbon.

2. Process of claim 1 wherein said gold containing solution contains one or more foreign metal ions from the group of copper, aluminum, antimony, bismuth, chromium and metals from Group VIII of the Periodic Table, and said foreign metal ions carried into the halogenated hydrocarbon during extracting step (b) are removed therefrom by shaking through a plug filter or with an aqueous solution containing hydrochloric acid and tetrahydrofuran.

3. Process of claim 1 wherein said aqueous solution contains from 4 to 80% of concentrated hydrochloric acid.

References Cited

UNITED STATES PATENTS

| | | | |
|---|---|---|---|
| 3,397,040 | 8/1968 | Lakin et al. | 75—118 X |
| 3,545,964 | 12/1970 | Hansen et al. | 260—430 X |

OTHER REFERENCES

Yoe et al.: "Journal of The American Chemical Society," vol. 61, 1939, pp. 2058–2063.

West: "Metallurgia," February 1956, pp. 91–93, 95, 96.

Chemical Abstracts, vol. 60, 1964, p. 15734g.

HERBERT T. CARTER, Primary Examiner

U.S. Cl. X.R.

23—230 R; 423—24, 34; 260—346.1, 430; 75—101 BE